United States Patent
Geng et al.

(10) Patent No.: US 8,121,079 B2
(45) Date of Patent: Feb. 21, 2012

(54) METHOD FOR ALLOCATING TRANSMISSION CAPACITIES DURING A SIGNAL TRANSMISSION, BASE STATION, AND MOBILE TERMINAL

(75) Inventors: Norbert Geng, Gilching (DE); Bernhard Raaf, Neuried (DE)

(73) Assignee: Siemens Aktiengesellschaft, Munich (DE)

( * ) Notice: Subject to any disclaimer, the term of this patent is extended or adjusted under 35 U.S.C. 154(b) by 1317 days.

(21) Appl. No.: 11/629,575

(22) PCT Filed: May 19, 2005

(86) PCT No.: PCT/EP2005/052316
§ 371 (c)(1),
(2), (4) Date: Dec. 14, 2006

(87) PCT Pub. No.: WO2005/122619
PCT Pub. Date: Dec. 22, 2005

(65) Prior Publication Data
US 2008/0069058 A1      Mar. 20, 2008

(30) Foreign Application Priority Data
Jun. 14, 2004   (DE) .......................... 10 2004 028 703

(51) Int. Cl.
*H04W 4/00* (2009.01)
(52) U.S. Cl. .......................... 370/329; 455/436; 455/450
(58) Field of Classification Search ............... 455/562.1, 455/447; 375/260; 370/333, 334, 336
See application file for complete search history.

(56) References Cited

U.S. PATENT DOCUMENTS

| | | | | |
|---|---|---|---|---|
| 7,245,594 B1 * | 7/2007 | Esteves et al. | ................ | 370/322 |
| 7,312,750 B2 * | 12/2007 | Mao et al. | ..................... | 342/377 |
| 2003/0125040 A1 | 7/2003 | Walton et al. | | |
| 2004/0063468 A1 * | 4/2004 | Frank | ............................ | 455/561 |
| 2004/0066754 A1 * | 4/2004 | Hottinen | ........................ | 370/252 |
| 2004/0146025 A1 * | 7/2004 | Hwang et al. | .................. | 370/334 |
| 2004/0198404 A1 * | 10/2004 | Attar et al. | ..................... | 455/522 |
| 2005/0207367 A1 * | 9/2005 | Onggosanusi et al. | ....... | 370/315 |
| 2005/0285803 A1 * | 12/2005 | Iacono et al. | ................. | 343/702 |
| 2006/0014542 A1 * | 1/2006 | Khandekar et al. | ........... | 455/447 |

OTHER PUBLICATIONS (Author not named), "Universal Mobile Telecommunications System (UMTS); Spacial channel model for Multiple Output (MIMO)simulations", ETSI Standards, dated Sep. 2003.
(Author not named), Universal Mobile Telecommunications System (UMTS); Spacial Channel Model for Multiple Input Multiple Output (MIMO) Simulations, ETSI Standards, dated Sep. 2003.

\* cited by examiner

*Primary Examiner* — Marcos Batista
(74) *Attorney, Agent, or Firm* — Laurence A. Greenberg; Werner H. Stemer; Ralph E. Locher

(57) ABSTRACT

Transmission capacities are allocated during a signal transmission from a base station of a cellular radio network to a number of mobile terminals, the base station simultaneously sending a plurality of oriented radio beams. A first candidate set of radio beams is defined, the main parameters thereof changing only slowly in relation to an acknowledgement time of the terminals. Information relating to the radio beams of the candidate set is then signaled to the terminals from the base station. Furthermore, pilot signals are emitted from the base station by the radio beams of the candidate set at short temporal intervals in relation to the variation time of the radio beams. The terminals respectively determine an SINR value for each of the radio beams of the candidate set by way of the received pilot signals and, for each received radio beam, respectively transmit an acknowledgement value determined on the basis of the corresponding SINR value to the base station. The acknowledgement values enable suitable combinations of radio beams for a subsequent signal transmission from the base station to be allocated to the different terminals.

10 Claims, 6 Drawing Sheets

METHOD FOR ALLOCATING TRANSMISSION CAPACITIES DURING A SIGNAL TRANSMISSION, BASE STATION, AND MOBILE TERMINAL

BACKGROUND OF THE INVENTION

Field of the Invention

The invention relates to a method for allocating transmission capacities during a signal transmission from a base station of a cellular radio network to a number of mobile terminals, with the base station simultaneously emitting a number of directed radio beams. In addition the invention relates to a base station and a mobile terminal with which such a method can be executed.

In cellular mobile radio systems a communication connection between a mobile terminal, also referred to in general terms as a terminal, mobile radio device or as User Equipment (UE), and the mobile radio network is established via what is known as a base station. This base station serves the mobile radio subscribers in a specific surrounding area in a cell over one or more radio channels and thus provides the actual radio interface between the mobile radio network and the mobile terminal. It handles the operation of the radio system with the different mobile subscribers within their cell and monitors the physical radio connections. In addition it transmits network and status messages to the terminals. In such cases a distinction is made between two connection directions. The downlink (DL) describes the direction from the base station to the mobile terminal, the uplink (UL) the direction from the mobile terminal to the base station.

The transmission method and the transmission structure or the type of channel architecture make a decisive contribution to defining the transmission quality to be achieved in a cell with a particular transmission throughput, e.g. how many users can be served simultaneously with sufficiently good transmission quality by a base station. A very interesting approach to a new transmission structure to which ever more research has been dedicated in recent years involves what are referred to as Multiple-Input/Multiple-Output systems, also abbreviated to MIMO systems. In such MIMO systems both the sending station and the receiving station operate with antenna arrays. This means that both the base station and also the terminals have a number of antennas. In such cases a base station, by appropriate control of the antennas of its antenna array, can emit a number of spatially-separated, directed radio beams (generally known simply as beams) to the terminals to be served. Basically any number of beams can be created with such an antenna array, with however the number of independent—i.e. orthogonal—beams being limited by the number of transmit antennas available. In a similar fashion spatial filters can be created on the receive side by means of an antenna array, i.e. reception from particular directions is maximized and reception from other directions is only poor.

This means that such a MIMO system is the most complex system architecture, which in the final analysis includes the previously known Single-Input/Multiple-Output systems (SIMO systems), Multiple-Input/Single-Output systems (MISO systems) and the simple Single-Input/Single-Output systems (SISO systems) as special cases, if the number of the transmit and/or the receive antennas is simply set to 1. It has already been shown that with a sufficiently high signal-to-noise ratio and in heavy-scatter environments, for example in towns, the normalized transmission capacity of a MIMO system exceeds the capacity of a SISO system by a factor of the order of magnitude of min $(M_T, M_R)$, where MT is the number of the transmit antennas and MR is the number of the receive antennas.

In order to exploit to the maximum possible extent the options provided for transmission of signals between a base station and a terminal with an antenna array and to achieve the high transmission rates which can in principle be obtained using the MIMO concept, the terminal should accordingly be allocated a number of spatially-separable data streams (e.g. on a number of beams) by the base station. On the other hand, for maximizing the overall throughput within the cell, it does not generally make any sense to allocate to a device all or an especially large number of the emitted beams, since this reduces the number of users able to be served simultaneously in the cell. To keep the overall throughput as high as possible with the best possible transmission quality, a decision must thus be made by the base station in each case as to which beams or combinations of beams can usefully be allocated to which terminals for a subsequent transmission of useful data, for example speech and/or multimedia data. When a mobile radio network with MIMO capabilities is set up it must also be ensured that a method is used with which, in the cells in which the base stations have an antenna array and thereby could support the MIMO method, even those terminals which for example have only one antenna can be optimally served in respect of their capabilities.

An optimum distribution of the transmission capacities is possible relatively easily if the scheduling program assigned to the base station (usually referred to as the scheduler) which is responsible for the management of the transmission capacities, provides sufficient information about the current state of the individual transmission channels or beams, known as the Channel State Information (CSI). In this case beams could be allocated to the individual terminals taking into account the individual channel states in each case.

In principle the transmission quality or the channel state can also be roughly estimated at the base station using the individually emitted beams. However the actual transmission quality depends not only on the radio channel and on the transmit power or other parameters for the setting of the beams by the base station, such as what are known as the beamforming vectors for example, but to a significant extent on other transmission conditions too, such as interferences with other transmission channels within the cell or outside it for example. Thus in the final analysis only the receiving terminal can use corresponding measurements to estimate sufficiently precisely how good the transmission quality on a specific beam is, and thereby determine reliable channel state information. To enable the base station to operate with this information, the individual terminals would have had to constantly return the respective current channel state information to the base station. Systems which operate with the channel state information sent back by the terminals are also referred to as closed-loop systems, by contrast with what are known as open-loop systems which do not require any channel state information at the transmitter.

However a problem arises precisely in the returning of the channel state information by the relevant terminal to the base station. On the one hand the bandwidth on feedback channels is restricted, so an unlimited amount of feedback information about the channel state cannot be transmitted from the individual terminals to the base station. A further problem is the currency of the information. It is thus frequently the case that the channel state information is already no longer applicable when the base station receives the feedback channel state information. This problem occurs very particularly with movements of the terminals within the cell, for example if a user is moving quickly, but especially of course when mobile radio devices are used in fast-moving motor vehicles. To simultaneously serve a number of terminals within a cell using a MIMO method, i.e. for a so-called "multi-user MIMO downlink method" a further significant problem arises in that changes in parameters for the beams of a device also have an influence on the channel states of the beams of the terminals (i.e. interference conditions change).

Transmission capacity management in which the individual terminals are allocated beams taking into consideration up-to-date, reliable channel state information has thus not previously been possible.

SUMMARY OF THE INVENTION

Consequently the object of the present invention is to specify a corresponding method for allocating the transmission capacities of a multi-user-capable MIMO downlink data transmission method which avoids the above-mentioned disadvantages, and to specify a corresponding base station and a mobile terminal with which this method can be executed.

This object is achieved by a method according to claim 1 or by a base station according to claim 9 and by a mobile terminal according to claim 10.

The inventive method is based on initially defining a first candidate set of beams, of which the major parameters are only changed slowly by comparison with a feedback time of the terminals. In general major parameters are seen as those which describe a beam with respect to its form and power emitted. Major parameters are also especially to be understood as the beamforming vectors and/or the transmit powers of the individual beams. The feedback time is to be understood as the time between receipt of consecutive acknowledgements from a terminal to the base station, i.e. the acknowledgements of the individual terminals which contain or represent the channel state information occur significantly more often than the change to the beam parameters.

In addition, with the inventive method, information about the beams of the candidate set is signaled to the individual terminals from the base station. For example the number of beams and/or details for identifying the beams and where necessary the transmit power emitted by the beams in each case is signaled to the terminals, provided this data is not defined in any event in a standard or similar and is thus already known to the terminals. This signaling too is undertaken on a long-term basis, i.e. the corresponding new information about the beams is only signaled to the terminals as a rule if the beam parameters are changed.

The number of terminals or beams can be any natural number used as part of registration, with the invention especially being used for a number of at least 2.

In this case the number of terminals can be the same, smaller or greater than the number of beams. In the first case one beam is provided for each terminal. In the second case a terminal is served by means of at least two beams, in the third case at least two terminals are served by one beam.

Furthermore in the inventive method, pilot signals are transmitted over the relevant beams of the candidate set from the base station at short time intervals in relation to the time taken for the beam parameters to change. The terminals then determine in each case, with the aid of the received pilot signals for each received beam an SINR value (SINR=Signal to Interference plus Noise Ratio) and determine once again on the basis of the relevant SINR values an acknowledgement value for each received beam, which they finally transmit to the base station. Using the acknowledgement values and if necessary further parameters the various terminals are then assigned suitable combinations of beams for a subsequent signal transmission from the base station. A suitable "combination of beams" is to be understood in this case as a specific terminal possibly being assigned only an individual beam or even for a subsequent signal transmission no beam at all. The further parameters, which can be taken into consideration in addition to acknowledgement values for the allocation of the beam combinations to the terminals depend inter alia on the intended objective, such as maximum throughput and/or optimum transmission to specific terminals for example, on priority rules for the operation of the different terminals or also on the receive facilities of the terminals involved, on whether for example the relevant terminal has an antenna array at all or just an individual antenna.

Consequently, in the inventive method, the beamforming vectors and/or transmit powers or if necessary further parameters of the beams are varied on a long-term scale, whereas the SINR values are repeatedly estimated on a short-term scale, i.e. at relatively short intervals, and the individual beam combinations are allocated to the terminals on the basis of these SINR values or on acknowledgement values based on them. This combination of "long-term beamforming" and "fast scheduling" ensures that the SINR values are reliable and thus that the allocation of the transmission capacities can be optimized for the individual terminals on a reliable basis. The invention thus provides the option of a very robust multi-user MIMO transmission, in which with relatively little signaling effort optimum use is made of the available transmission capacities.

The dependent claims and also the further description each contain especially advantageous embodiments and developments of the invention.

The pilot signals are preferably emitted so frequently that even fast-moving subscribers can securely estimate the current channel state of the beams. This depends on what is known as the coherence time of the radio channel. The coherence time is to be understood as the time during which the transmission conditions do not change significantly. Thus the pilot signals should have preferably been emitted at shorter intervals than the coherence time. Accordingly acknowledgement values are sent back just as frequently from the terminals to the base station. Especially preferably the pilot signals are emitted and the acknowledgement values transferred at fixed intervals, e.g. before each TTI (Transmission Time Interval). A TTI is the smallest unit of time in which users can be allocated the transmission channels. On the other hand the parameters of the beams of the candidate set should preferably only be modified slowly in relation to the coherence time.

In a very especially preferred variant of the inventive method a second, user-specific candidate set of beams is initially selected from the beams belonging to the first candidate set for each of the terminals, which is signaled to the terminals concerned in each case. It is then sufficient for example for the terminals, with the aid of the received pilot signals, to just determine an SINR value for the beams of the user-specific candidate set assigned to them and to transmit to the base station an acknowledgement value determined on the basis of the relevant SINR value. In this way the transmission capacity needed for the feedback can be drastically reduced, since unnecessary feedback is avoided. This is especially worthwhile since it is generally clear in any event that a transfer of beams in a specific angular range from the base station can only reach specific terminals. It is thus sufficient for the relevant terminals also only to attempt to estimate the SINR values for the beams emitted for their area or in their direction and transmit corresponding feedback information to the base station. In this case however the user-specific candidate sets of beams do not absolutely have to feature different beams. In reality a large number of beams belong as a rule to a number of different user-specific candidate sets.

Usefully the information about the individual beams of the candidate set transferred from the base station to the terminals includes the number of the beams of the candidate set and where necessary information for identifying which beams belong to which user-specific candidate set. Provided the transmit powers are not already fixed within a transmission standard, these too can also be notified in advance to the individual terminals. Provided each base station uses a separate pilot structure, i.e. different pilot signals or spread sequences, information is preferably also communicated to the terminals about the pilot structure of the pilot signals subsequently emitted via the beams of the candidate set. This is naturally not needed if for example all pilots of the base stations are defined exactly in advance in a standard and are thus known to the individual terminals.

The information about the beams belonging to the candidate set, i.e. the number of beams and/or the information about the identification of the beams and/or the transmit power on the individual beams and/or the pilot structure, is preferably transmitted jointly over a general information channel, for example the so-called Broadcast Channel (BCH) from the base station to all terminals in order to use as little transmission capacity as possible for this signaling.

There are different options for selecting a first candidate set. A number of methods for doing so will be explained in more detail later in this document. In a very simple-to-execute and thereby preferred variant, the first candidate set is selected on the basis of a grid of beams (GOB) comprising a number of beams which provide full coverage for a defined service area of the base station, for example a full circle or a sector around the base station. Preferably the beams overlap in these cases. Frequently such a grid of beams features orthogonal beams. However this does not absolutely have to be the case.

A CQI value (CQI=Channel Quality Indicator) is preferably determined as an acknowledgement value by the terminals on the basis of the relevant SINR value in each case. The advantage of this method lies in the fact that the quality of the receiving mobile radio device is implied in the CQI value. Basically the SINR value can also be transferred in digitized form as acknowledgement value. In this case however the base station would have to know the quality of the mobile terminals to enable it to undertake the corresponding optimum beam allocation. The CQI value also has the advantage of already including the desired Modulation and Coding Scheme (MCS) with which, for a specific SINR value for the relevant terminal, the optimum transmission conditions can be obtained. In this case, depending on the CQI value selected, either a high throughput can be achieved and/or a lowest error rate or one or more other general conditions can be optimized. This makes it possible for the base station, on the basis of the acknowledgement value, to undertake not only the allocation of the beams to the individual terminals, but also simultaneously to define a suitable modulation and coding scheme for the individual beams to the different terminals in order to ensure optimum transmission in this way.

A corresponding base station, in addition to the usual equipment which such a base station usually has, also needs means for allocating the transmission capacities for a simultaneous signal transmission to a number of mobile terminals via a number of directed beams, comprising the following components:

A beam configuration device to define a first candidate set of beams, with the major parameters of the beams only being changed slowly in relation to a feedback time of the terminals, A candidate set signaling device to signal to the terminals information about the beams of the candidate set, A pilot signal transmission device, to send out pilot signals about the beams of the candidate set to the terminals at short time intervals in relation to the modification time of the beams, A feedback receiving device, to receive from the different terminals acknowledgement values which were determined in each case on the basis of SINR values determined the aid of the received pilot signal for each of the received beams.

A beam allocation device, to allocate to the different terminals, using the acknowledgement value and if necessary further parameters, suitable combinations of beams for a subsequent signal transmission.

It should be pointed out once again that the major parameters—for the method as well as for the base station or/and the mobile terminal—can consist of beamform and power. Beamform in this case is taken to mean the amount and the phase in all spatial directions. With embodiments of the invention already described parameters such as modulation and coding have been adapted over the short term for each beam. In further embodiments there is also provision for adapting one or more parameters over the long term. In this case these parameters too represent major parameters.

By means of a suitable signaling device the users are then informed at short intervals before the actual useful signal transmission about the allocated radio beams.

Consequently, for inventive optimization of the overall system performance, the base station needs on the one hand a beam configuration device which operates with a long-term adaptation algorithm, and on the other hand a very fast scheduler, which, using the pilot signals sent out at short intervals and on the basis of the acknowledgement values triggered by these signals, undertakes a fast, constantly changing allocation of the beams of the only slowly changed set of beams to the individual terminals.

On the receiver side it is preferred, especially for the definition of user-specific candidate sets of beams, to use a mobile terminal which has a receiving device for receiving different beams sent out by a base station and for receiving information about a candidate set of beams assigned to a terminal. Furthermore this mobile terminal must feature a beam identification device in order to identify a received beam as belonging to the candidate set. In addition a beam quality determination device is needed in order to determine an SINR value for the beams belonging to the candidate set on the basis of pilot signals which the terminal has received in each case via the different beams from the base station. Finally the terminal must feature a feedback device in order to only send to the base station the acknowledgement values determined for the beams belonging to the candidate set of the relevant terminal on the basis of the SINR values.

It is clear that especially the inventive base station and the mobile terminal can also be further developed in a similar manner to the dependent claims and the description of the inventive method.

BRIEF DESCRIPTION OF THE DRAWINGS

The invention is explained once again below with reference to the enclosed Figures on the basis of exemplary embodiments. The figures show.

DESCRIPTION OF THE PREFERRED EMBODIMENTS

Figure 1:
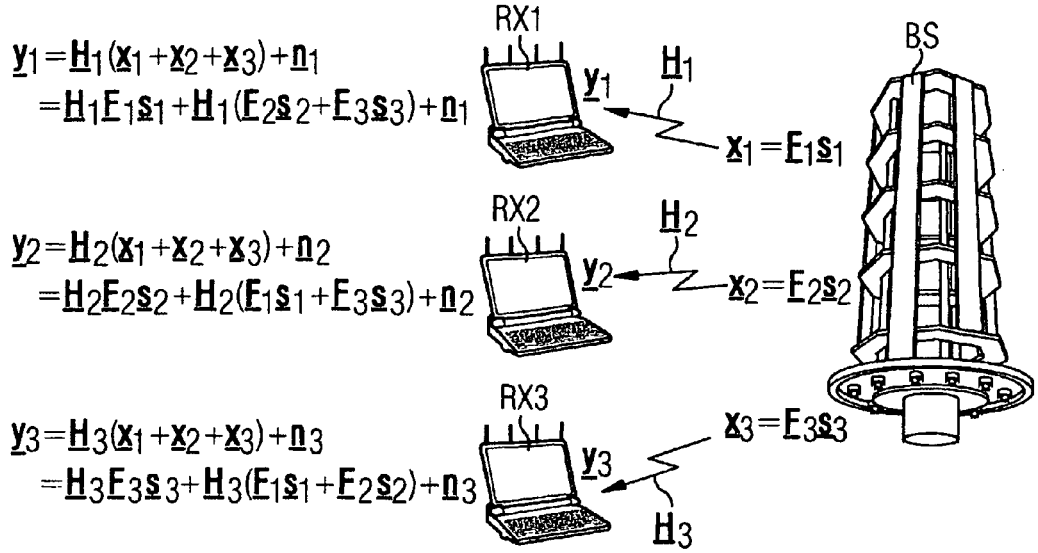
FIG. 1 a diagram of the signal vector transmitted from the base station for a general multi-user MIMO downlink transmission at three terminals and of the signal vectors received by the terminals, FIG. 2 an illustration of the multi-user MIMO downlink problem for three active subscribers in a cell, FIG. 3 a schematic diagram of a possible beam assignment for six subscribers in a cell, FIG. 4 a flowchart to illustrate an embodiment of the inventive method, FIG. 5 a schematic diagram of a grid of beams (GOB), which covers a 120° sector around a base station, FIG. 6 a diagram of the signal vectors transmitted from the base station for an inventive multi-user MIMO downlink transmission to three terminals and of the signal vectors received by the terminals, FIG. 7 a diagram for assignment of the SINR value to different MCS stages for optimizing the bandwidth efficiency, FIG. 8 a schematic diagram of an exemplary embodiment of an inventive base station, FIG. 9 a schematic diagram of an exemplary embodiment of an inventive mobile terminal.
Figure 2:
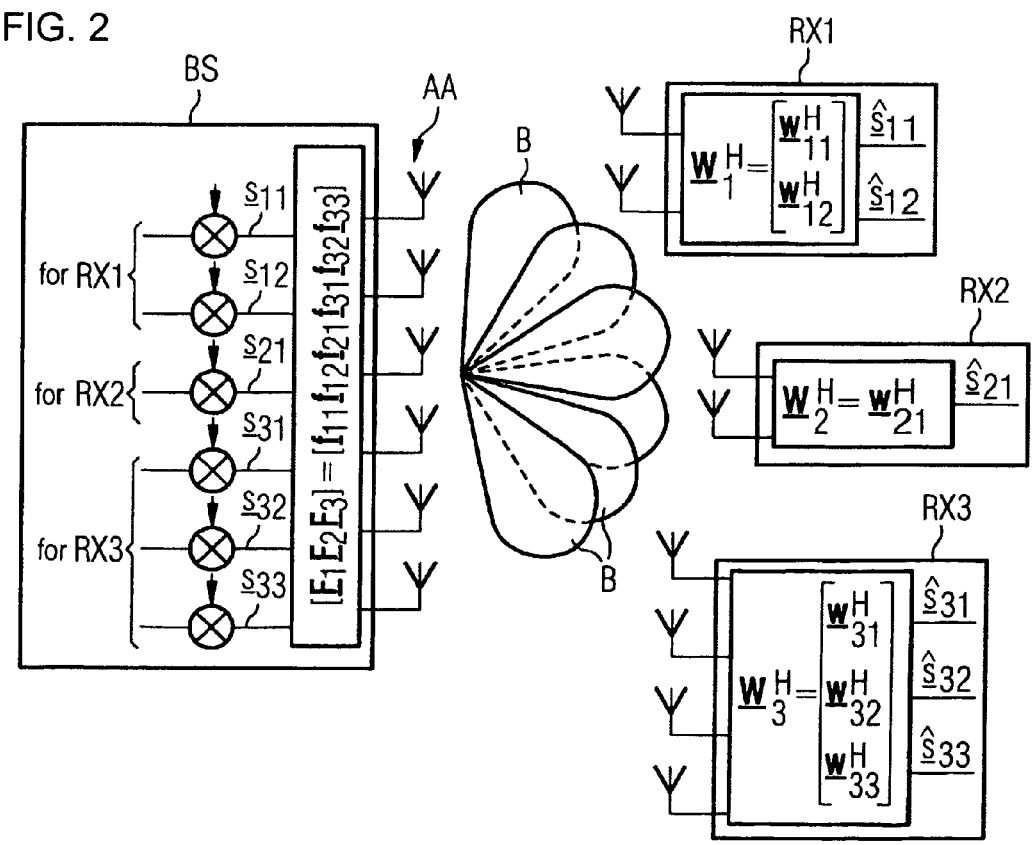

An illustration is provided on the basis of FIGS. 1 and 2 as to why the problems of resource administration in a multi-user MIMO downlink transmission system can be resolved to a large extent with the inventive method:

If a simplified configuration of one channel with what are known as flat fading propagation conditions is used as a starting point, i.e. a channel of which the transmission characteristics do not change significantly within the transmission bandwidth of the channel, a MIMO system which uses $M_{Rk}$ receive antennas and $M_T$ transmit antennas can be described by the complex $M_{Rk} \times M_T$ channel matrix $\underline{H}_k(t)$. In this case the index k identifies the kth user or the kth terminal. Furthermore the symbols which are transmitted at time t by the $M_T$ transmit antennas can be combined in an $M_T \times 1$ column vector $\underline{x}_k(t)$ and the samples received for the time t by the $M_{Rk} \times 1$ can be summarized by the column vector $\underline{x}_k(t)$. In the same way the noise samples (which are caused by thermal noise and by intercell interference, i.e. interference between adjacent cells) can be summarized in the $M_{Rk} \times 1$ noise vector $\underline{n}_k(t)$. A MIMO downlink transmission for the kth user can thus be described as follows:

$$\underline{x}_k = [\underline{x}_{k1}, \underline{x}_{k2}, \ldots, \underline{x}_{kM_T}]^T$$

$$\underline{y}_K = \underline{H}_k \underline{x}_k + \underline{n}_k \text{ with } \underline{y}_k = [\underline{y}_{k1}, \underline{y}_{k2}, \ldots, \underline{y}_{kM_{Rk}}]^T \text{ and } \underline{R}_{n_k n_k} = E\{\underline{n}_k \underline{n}_k^H\}$$

$$\underline{n}_k = [\underline{n}_{k1}, \underline{n}_{k2}, \ldots, \underline{n}_{kM_{Rk}}]^T \quad (1)$$

For the sake of simplicity here the time dependence has been initially ignored. It should however basically be noted that the nature of the channels is to change over time. In addition a noise covariance matrix $\underline{R}_{n_k n_k}$ is introduced. If one assumes ergodicity, this covariance matrix can be estimated by time averaging. It should be noted in this case that the noise term includes intercell interferences and is thus aligned spatially as a rule (i.e. $\underline{R}_{n_k n_k} \neq \sigma^2 I$)

In most cases it is advantageous within a symbol interval not to use $M_T$ independent complex symbols but only a reduced number $Q_k \leq \min(M_T, M_{Rk})$ of complex symbols. Since however all transmit antennas should be used if possible in order to profit from the antenna gain of the antenna arrays, the transmitted symbols which form the $Q_k \times 1$ column vector $\underline{s}_k$ are mapped linearly on the $M_T$ transmit antennas, a process which is frequently referred to as linear precoding. The following equations are then obtained:

$$\underline{y}_k = H_k F_k \underline{s}_k + \underline{n}_k \quad (2)$$
$$= G_{kk} \underline{s}_k + \underline{n}_k$$
$$= H_k \sum_{\theta=1}^{Q_k} \underline{f}_{k\theta} s_{k\theta} +$$

$$\underline{n}_k = \sum_{\theta=1}^{Q_k} \underline{g}_{kk\theta} s_{k\theta} + \underline{n}_k$$

$$\text{with } \begin{cases} F_k = [\underline{f}_{k1} \underline{f}_{k2} \cdots \underline{f}_{kQ_k}] = M_T \times Q_k \text{ and } \|\underline{f}_{k\theta}\| = 1 \forall \\ \theta = 1 \ldots Q_k \\ \underline{s}_k = [s_{k1}, s_{k2}, \ldots, s_{kQ_k}]^T \text{ and } R_{s_k s_k} = E \\ \{\underline{s}_k \underline{s}_k^H\} = \text{diag}(P_{k1}, \ldots, P_{kQ_k}) \end{cases} \quad (3)$$

The matrix $F_k$ is referred to in this case as a beamforming matrix and consists of the beamforming vector $\underline{f}_{k\theta}$. The beamforming vectors thus contain the parameters which determine in which direction and in which form the beams will be emitted from the base station.

The explanations below are based the assumption that in general different powers $P_{k\theta} = E\{|s_{k\theta}|^2\}$ are connected with the different data streams. Since in this method there is simultaneous transmission with a number of beams which are each represented by their beamforming vectors, this type of beamforming is also referred to as generalized beamforming.

This scheme is generally known for the special case $Q_k = 1$, i.e. for the use of only one beam for an individual user. The present case however involves spatial multiple methods in which the $Q_k$ parallel data streams are used to obtain a higher throughput instead of only an improved separation or pure antenna array or beamforming gain respectively. In such cases a prerequisite is that the $Q_k$ part data streams or beams are coded individually or that at least one channel quality determination for each individual beam is of value for the transmission capacity management, for the planning decision and/or for an adaptation of modulation and coding schemes.

The above equations (2) and (3) relate to an individual radio connection between a base station and one specific user, the kth user. Under real conditions however a number of beams are sent out in a multi-user MIMO system to a wide variety of users from the base station, a process which is usually referred to as SDMA (SDMA=Space Division Multiple Access). In this case different users will, in addition to SDMA (Space Division Multiple Access), FDMA (Frequency Division Multiple Access) and/or CDMA (Code Division Multiple Access) be separated purely spatially by characteristics of the different beams. In addition, with a multi-user MIMO system—as the definition "MIMO" implies, it occurs that more than one beam is provided for a user. Such methods in which a number of data streams are transmitted simultaneously separated in space on the same frequency and with the same code to a user, are also referred to as SMUX (Spatial Multiplexing).

The signal received by the terminal k can thus be described in general terms as follows:

$$\underline{y}_k = H_k \sum_{\kappa=1}^{K} \underline{x}_\kappa + \underline{n}_k \quad (4)$$

$$= H_k \sum_{\kappa=1}^{K} F_\kappa \underline{s}_\kappa + \underline{n}_k$$

$$= H_k F_k \underline{s}_k + H_k \sum_{\substack{\kappa=1 \\ \kappa \neq k}}^{K} F_\kappa \underline{s}_\kappa + \underline{n}_k$$

In FIG. 1 this case shown for three terminals RX1, RX2, RX3 which are served by one base station BS. In this Figure the transmit symbol vectors $\underline{x}_1$, $\underline{x}_2$, $\underline{x}_3$ as well as the receive sample vectors $\underline{y}_1$, $\underline{y}_2$, $\underline{y}_3$ for the three terminals RX1, RX2, RX3 are also specified, as produced by equation (4).

The signals transferred to the different users still pass the same MIMO channel $H_k$. However in general the antenna weighting factors, i.e. the beamforming vectors $\underline{f}_{k\theta}$ (with $\theta=1 \ldots Q_k$), which are used for the different users are different, which in the final analysis leads to different effective MIMO channels $\underline{G}_{kK}=H_k F_k$. Consequently the kth terminal can actually measure its own channel $H_k$ or even the effective channel $\underline{G}_{kk}$ including its own transmit beamforming vector. The knowledge of the transmit beamforming matrices $F_k$ for the other user $K \neq k$ is however generally not provided since this would require an excessive forwards signaling from the base station to the individual users.

For an individual beam q for a specific user k (i.e. for the beam over which the data symbols $\underline{S}_{kq}$ are transmitted) the following the applies $$\underline{y}_k = \underbrace{H_k \underline{f}_{kq} s_{kq}}_{I} + \underbrace{\sum_{\substack{\theta=1 \\ \theta \neq q}}^{Q_k} H_k \underline{f}_{k\theta} s_{k\theta}}_{II} + \underbrace{\sum_{\substack{\kappa=1 \\ \kappa \neq k}}^{K} \sum_{\theta=1}^{Q_\kappa} H_k \underline{f}_{\kappa\theta} s_{\kappa\theta}}_{III} + \underbrace{\underline{n}_k}_{IV} \quad (5)$$

The first term I is the actual signal of interest. The second summand II specifies what is known as the self-interference which arises through a number of beams being transmitted to the same user. The third summand III specifies what is known as the intracell interference which is caused by beams also being emitted simultaneously to other users in this cell. The last summand IV contains the general noise including what are known as intercell interferences from beams from adjacent cells.

For optimum receiving the different beams must be handled jointly for a user. Equation (5) can thus not be used without restrictions. It still shows however that with linear receive conditions the signal available for the user k in a specific beam q is a superposition of the signal of interest, of the self-interference component, of the intracell interference component and also of the "noise plus intercell interference component".

On the receiver side the transferred signals are estimated by suitable weighting of the individual sample values in the vector $\underline{y}_k$ when a linear receiver is used. This can be interpreted as beamforming on the receiver side. The receiver beamforming matrix for the kth user can be referred to here as $\underline{W}_k$. In this case the estimated value for the transferred signal vector $\underline{S}_k$ is given by:

$$\hat{\underline{s}}_k = \underline{W}_k^H \underline{y}_k \quad (6)$$

$$= \underline{W}_k^H \left( H_k \sum_{\kappa=1}^{K} F_\kappa \underline{s}_\kappa + \underline{n}_k \right)$$

$$= \underline{W}_k^H H_k F_k \underline{s}_k + \underline{W}_k^H H_k \sum_{\substack{\kappa=1 \\ \kappa \neq k}}^{K} F_\kappa \underline{s}_\kappa + \underline{W}_k^H \underline{n}_k$$

with $$\underline{W}_k = [\underline{w}_{k1} \underline{w}_{k2} \cdots \underline{w}_{kQ_k}]$$

$$= M_{Rk} \times Q_k \text{ Matrix}$$

Such a receiving beamforming is usually also referred to as spatial filtering. A diversity of methods including the so-called zero-forcing (ZF) or the Minimum Mean Square Error (MMSE) are applicable within the framework of the invention. All these methods are known to the person skilled in the art, so that there is no need to discuss them further here.

For an individual beam q for a user k the equation can again be written similar to equation (5)

$$\hat{s}_{kq} = \underbrace{\underline{w}_{kq}^H H_k \underline{f}_{kq} s_{kq}}_{I'} + \underbrace{\sum_{\substack{\theta=1 \\ \theta \neq q}}^{Q_k} \underline{w}_{kq}^H H_k \underline{f}_{k\theta} s_{k\theta}}_{II'} + \underbrace{\sum_{\substack{\kappa=1 \\ \kappa \neq k}}^{K} \sum_{\theta=1}^{Q_\kappa} \underline{w}_{kq}^H H_k \underline{f}_{\kappa\theta} s_{\kappa\theta}}_{III'} + \underbrace{\underline{w}_{kq}^H \underline{n}_k}_{IV'} \quad (7)$$

Here too the first term I is again the actual signal of interest, the second summand II specifies the self-interference, the third summand III the intracell interference and the last summand IV the general noise including the intercell interferences.

This multi-user MIMO downlink situation is shown again in FIG. 2 for three active users. In this specific example it was decided that the base station BS sends two beams ($Q_1=2$) to the terminal RX1, only one beam ($Q_2=1$) to the terminal RX2 and three beams ($Q_3=3$) to the terminal RX3. Thus the number of beams sent simultaneously is $\Sigma Q_k=6$. These are mapped with the aid of six beamforming vectors on the $M_T=8$ transmit antennas. Each of the receivers uses a suitable spatial filter, i.e. appropriate beamforming matrices or vectors to extract and estimate the signals of interest and simultaneously to suppress interferences from other beams as well as intercell interferences (which are not shown in the Figure).

On the receiver side this thus produces a signal-to-interference-plus-noise ratio (SINR) of the beam kq (i.e. of the qth beam detected by the kth user) according to:

$$SINR_{kq} = \frac{P_{signal,kq}}{P_{self,kq} + P_{intra,kq} + P_{noise+inter,kq}} \quad (8)$$

with the following then applying:

$$P_{signal,kq} = P_{kq}|\underline{w}_{kq}^H H_k \underline{f}_{kq}|^2 \quad (9)$$

$$P_{self,kq} = \sum_{\substack{\theta=1 \\ \theta \neq q}}^{Q_k} P_{k\theta}|\underline{w}_{kq}^H H_k \underline{f}_{k\theta}|^2$$

$$P_{intra,kq} = \sum_{\substack{\kappa=1 \\ \kappa \neq k}}^{K} \sum_{\theta=1}^{Q_K} P_{\kappa\theta}|\underline{w}_{kq}^H H_k \underline{f}_{\kappa\theta}|^2$$

$$P_{noise+inter,kq} = \underline{w}_{kq}^H R_{n_k n_k} \underline{w}_{kq}$$

As can be seen from equation (8), the divider contains as summands both the noise-plus-intercell-interference component and also the self-interference component and the intra-cell interference component as a result of beams emitted to other users within the cell. The equations (8) and (9) clearly show in this case that the SINR value measured by a specific terminal for a specific beam not only depends on the power $P_{kq}$, with which the data stream of interest is transmitted, and on the inevitable noise-plus-intercell interference covariance matrix $Rn_k n_k$ and the MIMO channel matrix $H_k$. The SINR value also includes the signal powers which were selected for other beams and/or other users, as well as the beamforming matrices $F_k$ for all other users.

As a consequence it is not a trivial problem to provide the base station with a reliable current estimate of the SINR value and thereby of the channel state of the individual beams to the different terminals, so that the latter can undertake the allocation of the transmit resources in the optimum manner. When only one beamforming vector $f_{k\theta}$ and/or one of the power values $P_{k\theta}$ used for these individual beams is changed, an SINR value measured or estimated beforehand is no longer valid at the time of the subsequent transmission. It should be noted in this case that in addition the choice of the receive beamforming matrix, i.e. the spatial filter. In accordance with equations (8) and (9), basically also depends on the transmit beamforming vectors and the individual beam powers. This makes the dependency of the individual, estimated SINR-values for the different beams on all other beamforming vectors and the associated powers even more complicated than has been presented in simplified form here.

This main problem of unreliability or lack of currency of the SINR values or the acknowledgement values RW based on them is surmounted by the inventive method.

Figure 3:
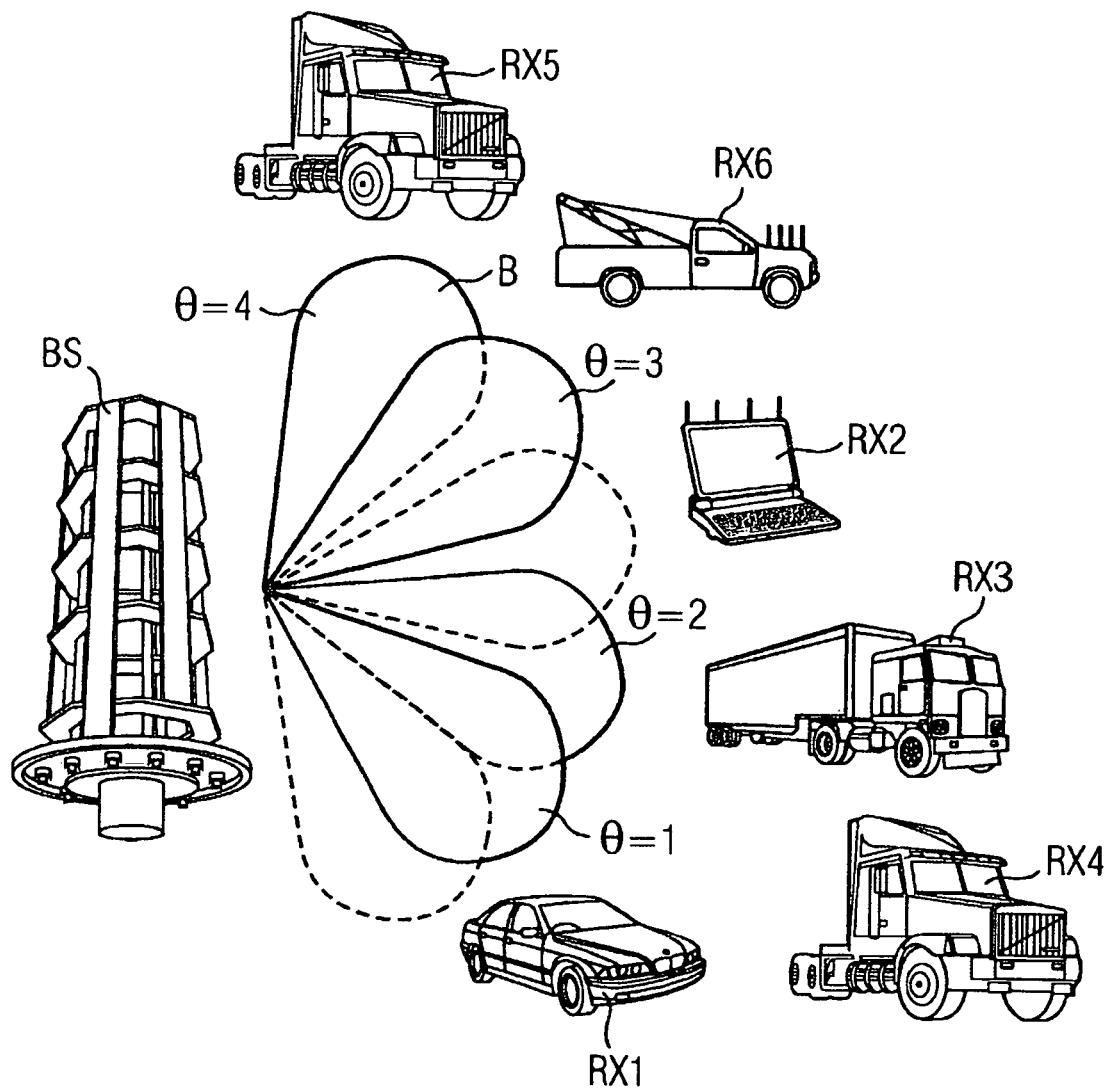

A typical usage situation in a cell of a mobile radio network is shown in FIG. 3. Here a total of six terminals RX1, ..., RX6 are to be served by a base station BS. To this end the base station BS emits by means of its antenna array, as was described above, a plurality of directed beams B, where the different beams B will be assigned to the individual users RX1, ..., RX6. A possible method with which the base station can allocate to the individual users RX1, ..., RX6 the available beams is described below with reference to a preferred exemplary embodiment of the invention.

Figure 4:
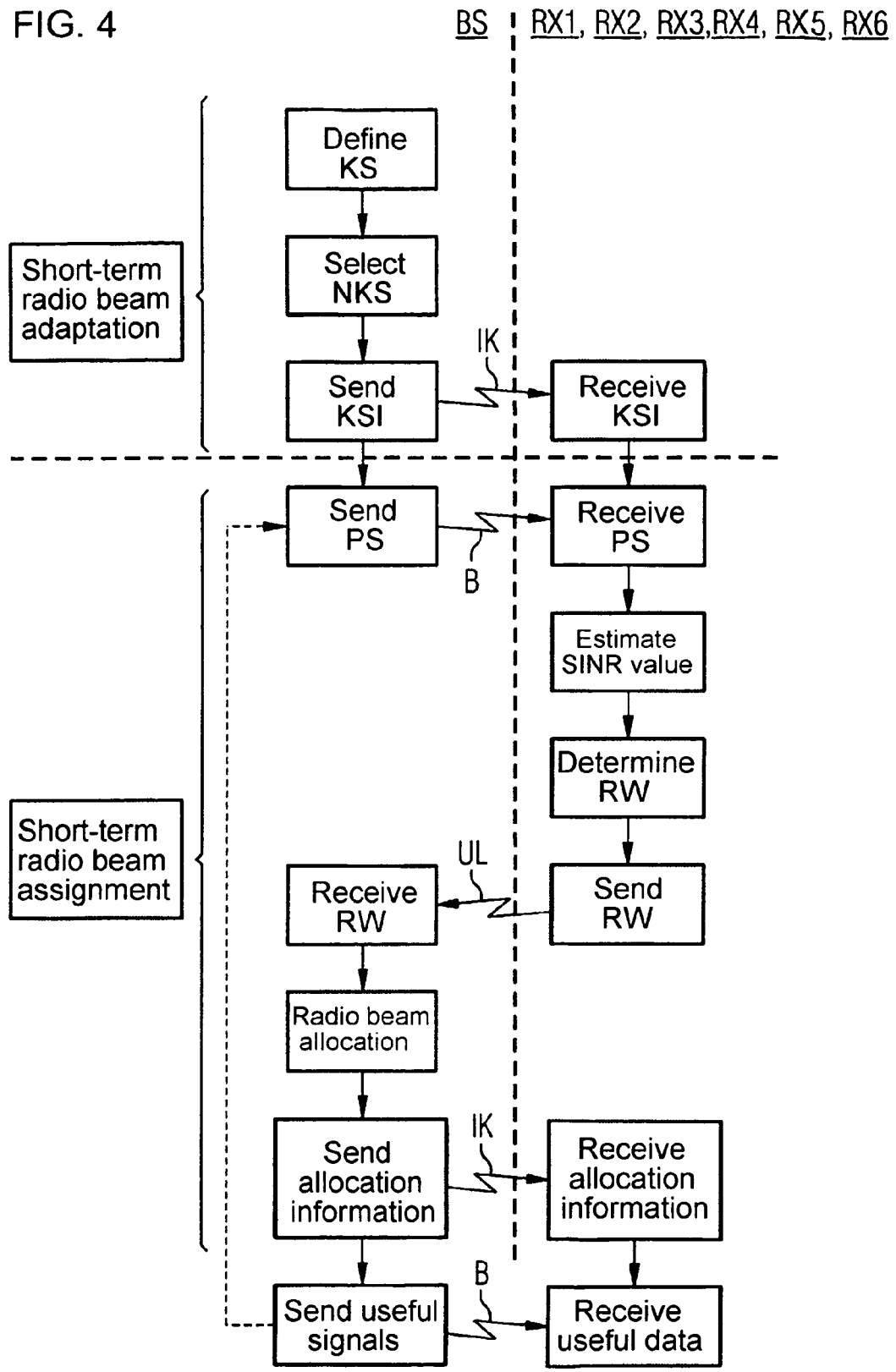

FIG. 4 shows the method steps for this inventive method in greater detail. The individual steps executed by the base station BS are shown on the left-hand side, and the individual steps executed in each case by the various mobile terminals RX1, ..., RX6 are shown on the right-hand side.

The area in FIG. 4 above the dashed line shows in this case the actions within the framework of long-term beam adaptation in which on a long-term scale the beams or a set of beams are defined and only within time intervals on the short-term scale are they changed or adapted to changed transmit conditions. On the other hand the fast scheduling occurring on a short-term scale is shown below the dashed line, in which the only slowly varied beams are allocated in the short term to the individual terminals RX1, ..., RX6.

In the present case the expression "long-term" means longer than the coherence time and the expression "short-term" means significantly shorter than the coherence time of the relevant transmission channel. The "long-term scale" in this case preferably lies in the order of magnitude of a few 100 ms to a few seconds, whereas the short-term assignment of the beams with fast scheduling instead occurs in the 1 ms clock.

Since the significant parameters of the beams, namely the beamforming vectors and the transmit power, are only changed slowly here in relation to the feedback times, the main problem discussed in detail above, which leads to the unreliability of the SINR-values and thus to incorrect current channel state information, namely the dependency of the SINR values on the beam parameters within the cell, is largely reduced, sometimes even completely eliminated.

In the long-term beam adaptation, as shown in FIG. 4, a candidate set KS of beams B is initially defined by the base station. This can be done in different ways.

Figure 5:
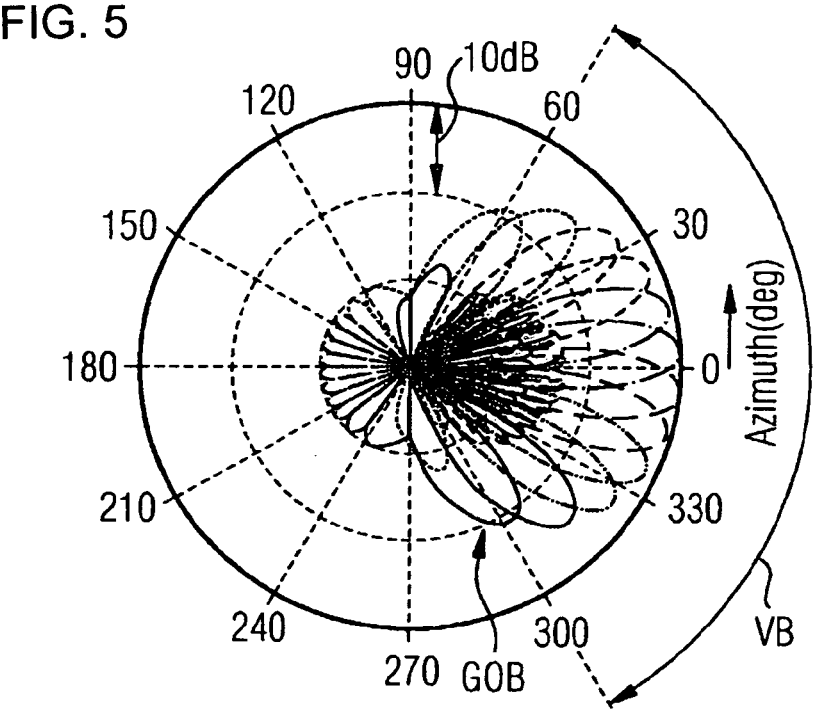

An especially simple and therefore specially preferred solution for definition of the candidate set KS of beams is based on the already mentioned grid of beams concept. In this case a predefined set of beamforming vectors is simply arranged on the antenna array so these emit a number of beams B which give full coverage for a defined service area of the base station BS. This is shown particularly clearly in FIG. 5. Here, with the aid of a grid of beams GOB with twelve beams B, a service area VB in the form of a 120° sector is covered by the base station BS, with the individual beams B overlapping in each case. The service area VB defines the cell for which the base station BS concerned is responsible and thus depends on the position of the base station BS as well as the position of the other base stations within the cellular network. Thus for example through a correspondingly higher number of beams and/or through wider beams a larger sector, if necessary the entire full circle around the base station BS, will be covered. Provided the beamforming vectors are required to be orthogonal, the number of the beams B within the grid of beams GOB must be below the number of antennas of the base station BS. Under certain circumstances however it is also advantageous to select the number of beams available, i.e. the number of beams in the candidate set to be above the number of antennas, for example twice the number of beams. This reduces the likelihood of the users being located immediately between two adjacent beams of the grid of beams.

Another option for defining a candidate set of beams consists of a set of orthonormal beams first being constructed which spans the same space as the total of all so-called strong "own beams" of the individual users.

The term "own beam" goes back to an approach for such cases in which the base station only transmits to an individual user. With so called long-term own beamforming (EBF) the beamforming matrix $F_k$ can be defined by a set of own vectors of the MIMO covariance matrix. In this case the long-term beamforming matrix $F_k$ for the downlink transmission can be calculated from the corresponding transmission beamforming matrix $F_{k,UL}$ in the uplink, which is produced as follows:

$$E\{\underline{H}_{k,UL}^* \underline{H}_{k,UL}^T\}\underline{F}_{k,UL} = \underline{F}_{k,UL} diag(\lambda_1, \ldots, \lambda_r) \text{ with}$$
$$r \leq \min(M_T, M_{Rk}) \quad (10)$$

The own values $\lambda 1, \ldots, \lambda r$ in this case specify the average long-term power transmission factors of the associated long-term beam (defined by the own vectors of the corresponding Index). On this basis the base station can then define a set of long-term beams which on average transmits a very large fraction of the total energy (as a rule. >95%) to the receiver, and can also assign the different selected long-term beams to the suitable transmit power.

With the inventive concept employed here, in which a number of users are located in a cell, an othonormal set of beams can be constructed just as easily spanning the same space as the strongest own beams of all users. This ensures that no relevant directions remain unconsidered.

With another simpler and possibly better variant the transmitter beamforming vectors for definition of the candidate set of beams can also be selected to take account of the joint MIMO covariance matrix of all users. With this method a candidate set of Q long-term beams can be determined by $$\left(\sum_{k=1}^{K} E\{H_k^H H_k\}\right) F_\Sigma = \qquad (11)$$

$$F_\Sigma \mathrm{diag}(\lambda_1, \ldots, \lambda_{r_\Sigma}) \text{ with } r_\Sigma \leq \min\left(M_T, \sum_{k=1}^{K} M_{Rk}\right)$$

In this case, for reasons of simplicity the downlink matrix $H_k = H_{k,DL} = H_{k,UL}^T$ has been used in equation (11), although this only applies to TDD (Time Division Duplexing) transmission methods. However corresponding long-term variables can also de determined for the FDD (Frequency Division Duplexing) methods with $E\{H_{k,UL}^* H_{k,UL}^T\}$ (i.e. from the uplink channels, provided they are taken into account by a frequency transformation corresponding to the carrier frequency offset), or with $E\{H_k^H H_k\}$ (i.e. from the downlink channels plus the low-rate feedback to the base station).

Such a choice of a candidate set in accordance with equation (11) ensures that for an unequal distribution of users within the relevant cell only the directions in which users are actually located are served. To this extent this approach has advantages compared to the even simpler grid of beams (GOB) method which was initially described above for the case in which the number of beams in the GOB is not further reduced as a result of the knowledge of the joint MIMO covariance matrix.

To increase the fairness in a decision to define a candidate set of long-term beams, path losses and shadowing can be removed from the MIMO covariance matrix, which prevents the selection consisting of the beams being dominated by terminals which have particularly good channels. In this case the set of beams, instead of equation (11) can be determined in accordance with:

$$\left(\sum_{k=1}^{K} \frac{E\{H_k^H H_k\}}{E\{\|H_k\|_F^2\}}\right) F_\Sigma = \qquad (12)$$

$$F_\Sigma \mathrm{diag}(\lambda_1, \ldots, \lambda_{r_\Sigma}) \text{ with } r_\Sigma \leq \min\left(M_T, \sum_{k=1}^{K} M_{Rk}\right)$$

with the average total MIMO energy transfer per user being taken into consideration by the normalization using the term $\|H_k\|F^2 = \Sigma_i \Sigma_j |H_{k,ij}|^2$. In both cases the number $Q \leq r_\Sigma$ of beams which are actually used as well as the transmit power assigned to the individual beams e.g. based on a statistical water-filling model, can then be determined on the basis of the long-term own values $\lambda_1, \ldots \lambda_{r_\Sigma}$. In the case of only one individual user in the cell this would again lead back to the individual user own beamforming model in accordance with equation (10). I.e. this model is a special case within the proposed general model.

In practice it can be of advantage to replace the set of own beams of the joint MIMO covariance matrix by a set of spatially clearly separated beams, since own beams generally exhibit a very complicated geometrical form, which can have a negative effect on subsequent fast scheduling. To this end, those beamforming vectors are selected in turn from a regular, preferably orthogonal grid of beams (beginning with the strongest) which are necessary, to use 95% of the total available power for example. For the special case of 95% as threshold value and a variant, which represents a certain fairness between the users, this means for example $$F_{GOB} = [f_{GOB,1}, f_{GOB,2}, \ldots, f_{GOB,M_T}] \text{ with } F_{GOB}^H F_{GOB} \qquad (13)$$

$$= I_{M_T \times M_T} f_{GOB,q}^H \left(\sum_{k=1}^{K} \frac{E\{H_k^H H_k\}}{E\{\|H_k\|_F^2\}}\right) f_{GOB,q}$$

$$= \varepsilon_q \text{ with } q \in \{1, 2, \ldots, M_T\}$$

Select minimum number of beams for $$\sum_q \varepsilon_q \geq 0.95 \text{ trace}\left(\sum_{k=1}^{K} \frac{E\{H_k^H H_k\}}{E\{\|H_k\|_F^2\}}\right)$$

with the minimum number $Q \leq M_T$, for which the conditions can be met corresponding to the first candidate set. For maximizing throughflow (without recourse to fairness) however an equation similar to (11) would be selected.

Then in the second step based on the candidate set of beams selected in this way, a user-specific candidate set NKS is selected for the individual users. This avoids the individual terminals RX1, . . . , RX6 unnecessarily attempting in each case, for beams, which are not suitable for them—since for example they cover a completely different spatial area—to calculate and return acknowledgement values. A user-specific candidate set can in this case basically also only consist of an individual beam. As a rule however it comprises a number of beams.

The selection of the individual user-specific candidate set can in this case also be undertaken especially on the basis of predetermined general conditions such as service/quality conditions, user priorities etc. In addition, for the selection of the user-specific candidate sets—where available—information about the long-term channel quality of the individual beams is used, which for example can be estimated by the base station from the uplink channels of the terminals.

It is expressly pointed out at this juncture that both for the determination of the candidate set in the first stage and also for selection of the user-specific candidate sets from the first defined candidate set, any algorithms, even very complicated algorithms can be used. This then applies equally to the determination of the powers emitted via the individual beams. To this extent the above described methods for determining the suitable candidate sets of beams and associated transmit powers are only to be understood as a current preferred exemplary embodiment.

Within the context of the invention on the other hand any long-term adaptation of the individual beams in the candidate set can be undertaken. This especially includes the special case, in which the individual users are assigned specific antennas in each case.

The precise implementation in the final analysis is a question of the hardware and software design in the base station and depends inter alia on the manner and the long-term channel state information which the base station receives in relation to the beams within the candidate set. In most cases long-term channel state information can be estimated relatively reliably from the uplink channel, since the significant knowledge which is required for long-term beam adaptation, such as propagation angle, average power of the multipath components etc. is generally constant over a relatively large bandwidth.

The long-term beam adaptation method used in each case should however always be embodied such that unnecessary energy losses as well as the generation of unnecessary interference is avoided, because for example a part of the emitted power definitively does not reach the desired users.

In the third step shown in FIG. 4 it is then ensured that the base station sends suitable candidate set information KSI about the user-specific candidate sets to relevant terminals RX1, . . . , RX6. In this case the base station sends to the individual terminals RX1, . . . , RX6 all necessary information about the previously defined user-specific candidate sets, especially the number of the beams Q within the user-specific candidate sets NKS and authentication information as to whether a particular beam belongs to a particular candidate set, the powers emitted on the beams, provided these powers are not rigidly defined beforehand, and preferably also about the associated pilot signal structure, provided this is not also generally defined. This candidate set information KSI is preferably transmitted on a general information channel, here on the Broadcast Channel (BCH). As FIG. 4 shows, this candidate set-information KSI is also transferred on a long-term scale, corresponding to the adaptation or modification of the individual beams B in the candidate sets KS, NKS.

The individual terminals RX1, . . . , RX6 thus receive at corresponding relatively long intervals of a few 100 ms to a few s new candidate set information KSI and thus know which current candidate sets NKS are available for them and which beams B emitted from the base station they have to take into account in the further procedural steps shown in FIG. 4.

All further method steps shown in this Figure are undertaken in this case on a short-term scale, for example at 1 ms intervals. In this case the base station initially sends pilot signals to the individual terminals RX1, . . . , RX6 at regular intervals, with for example what are known as SCPiCHs (Secondary Common Pilot Channels) being used for the transmission. The individual terminals RX1, . . . , RX6 receive these pilot signals on the different beams B and can estimate the SINR value in a subsequent step in each case.

Figure 6:
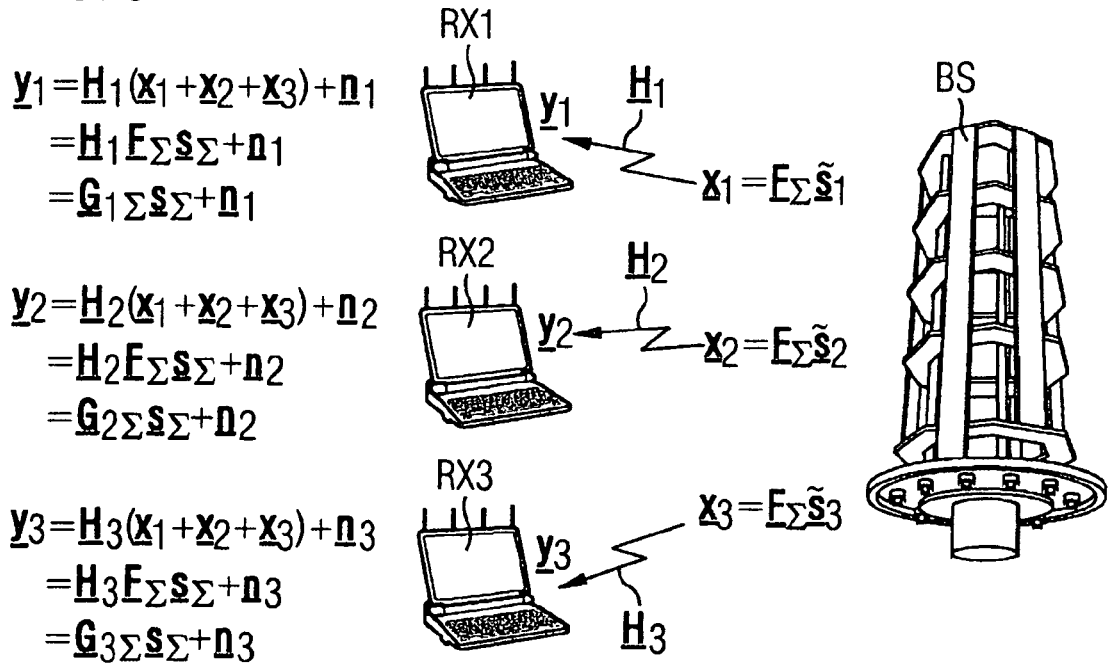

This can be illustrated once more with reference of FIG. 6. The situation presented in this Figure is restricted to three active users for the sake of simplicity. This Figure shows, for the method in accordance with the invention, signal vectors $\underline{X}_1, \underline{X}_2, \underline{X}_3$ transmitted from the base station and the signal vectors received by the individual users RX1, RX2, RX3 $\underline{Y}_1, \underline{Y}_2, \underline{Y}_3$. In such cases the base station uses a beamforming matrix $F_\Sigma$, to define the individual beams, for which in accordance with the invention adaptation only occurs on a long-term basis. On each beam which belongs to a column of this beamforming matrix $F_\Sigma$, a pilot signal is transmitted on the SCPiCH of the relevant beam, which allows each of the k=3 users RX1, RX2, RX3 a reliable estimation of the effective channel matrix $\underline{G}_{k\Sigma}$ or of the columns this matrix, which must be estimated in order to estimate the SINR values of all beams within the candidate set. Since the powers $P_\theta = E\{|\underline{S}_{\Sigma\theta}|^2\}$ are also only adapted on a long-term scale for all beams and thus all relevant parameters contained in FIG. 6 are known in each case to the corresponding terminals RX1, RX2, RX3 or can be measured, each user can reliably estimate the SINR values.

In the following step shown in FIG. 4, acknowledgement values are then determined by the individual terminals RX1, . . . , RX6 on the basis of the estimated SINR values.

Especially preferably the SINR values are converted for this purpose into CQI values, which contain the modulation and coding scheme (MCS) required by the relevant terminal on the relevant beam. Within the HSDPA specifications of the 3GPP standard an MCS stage is encoded within a 5-bit CQI for example. The use of the CQI values as acknowledgement values RW has the advantage that, by the selection of the modulation and coding scheme by the relevant terminal, the terminal quality is included directly in the acknowledgement value RW. The base station thus obtains all the necessary values with very little signaling effort.

Figure 7:
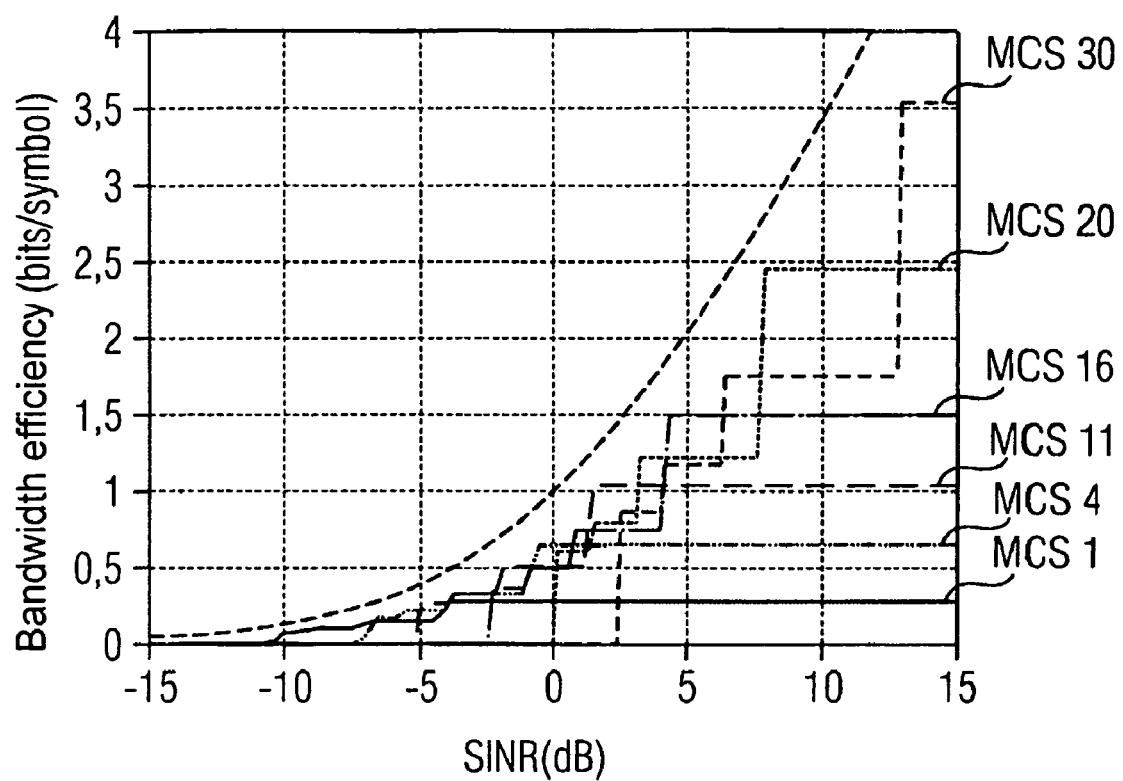

FIG. 7 shows an example of how the relevant terminal can determine an MCS stage on the basis of an estimated SINR value. The diagram shows the assignment of MCS stages to measured SINR values under the condition that a maximum signal throughput is to be achieved. Only one example is involved in this case. Basically the MCS stage can also be selected on the basis of other conditions, for example in respect of a reduction of the frame error rate or the bit error rate etc. The diagram also depicts, in the form of a dashed line, what is known as the Shannon limit, which specifies the maximum transmission capacity achievable with an ideal coding. To improve clarity FIG. 7 only shows 6 MCS stages from a set of a total of 30 MCS stages, as are usually used for example within the 3GPP HSDPA Specification. Within this reduced set of 6 MCS stages the MCS stage 20 would be selected for example if an SINR value between 8 dB and 13 dB were determined, since this MCS stage guarantees the highest bandwidth efficiency and thus the maximum throughput for this SINR. On the other hand for example the MCS stage 1 would be selected for an SINR value below −7 dB in order to achieve a maximum throughput.

The acknowledgement values RW determined are then sent on an uplink channel UL from the individual terminals RX1, . . . , RX6 to the base station BS, which undertakes the actual beam allocation on the basis of the received acknowledgement values RW. In this case not only are the acknowledgement values taken into account, but also further conditions such as for example a diversity of QoS conditions (QoS=Quality of Service), i.e. for example characteristics assured by the system such as data rate, maximum delay etc., Priorities of the individual users, fairness-conditions (i.e. whether a user has not been served for a long time), the bandwidth efficiency to be achieved or the quality which can be obtained overall at the individual terminals. In particular account should also be taken here of which capability the individual terminals have, for example whether they have an antenna array at all and could thus suitably process a number of beams or merely possess a single antenna. The base station preferably already receives this information, as soon as the relevant terminal moves in the cell of the base station, for example with handover signaling.

In determining suitable beam combinations for the individual users for the subsequent transmission it is entirely possible for a few users to be allocated a number of beams, other users only one beam and for further users to not be allocated any beam at all in the subsequent transmission period.

A typical example of this is shown in FIG. 3. The base station here has finally selected from a grid of beams with 6 beams, 4 beams for the candidate set. The user-specific candidate sets for the individual user RX1, . . . , RX6 are for example beam θ=1 for the first user RX1, the beams θ=2 and θ=3 for the second user RX2, the beams θ=2 for the third user RX3, the beams θ=1 and θ=2 for the fourth user RX4, the beam θ=4 for the fifth user RX5 and the beams θ=3 and θ=4 for the sixth user RX6. Based on the fast CQI acknowledgement values and a diversity of further above-mentioned parameters, the scheduler has then decided to select the beam θ=1 for user 1, the beam θ=2 for user three and the beam θ=3 and θ=4 for an SMUX method, with which the sixth user RX6 is served. In this case appropriate NCSS stages are selected in accordance with the CQI acknowledgement values. The other users are not served over the short term in the subsequent transmission time interval (TTI), but are taken into account for example during the subsequent following TTIs, preferably being given priority.

Before the subsequent transmission of the payload signals the base station must now notify all mobile users about the scheduling decision concerned, i.e. the users receive the required information, to be able to detect the subsequent payload data (i.e. which beam or which set of beams is used for the users concerned and possibly the decision value for the selected MCS, provided the BS differs from the desire of the MS). This can be done for example over a broadcast channel or also user-specific control channels.

Subsequently, in the following TTI, a payload signal is transmitted which contains the actual voice or multimedia data to be transmitted to the terminals. As indicated in FIG. 4 by the dashed return arrow, after the transmission of the useful signal from the base station a new pilot signal is immediately sent out again and the SINR values are once again estimated by the terminals RX1, RX2, . . . , RX6 on the basis of the received pilot signal and acknowledgement values are determined from these, which are again sent to the base station BS, which then allocates to the terminals RX1, RX2, . . . , RX6 the beams for the next TTI. This loop will be executed here for each TTI. Only if an adaptation of the beams, i.e. a change of the candidate set, is undertaken on the long-term scale, will new candidate set information KSI again be sent from the base station over the Broadcast Channel to the terminals RX1, RX2, . . . , RX6, which then perform the subsequent estimates of the STNR values on the basis of the new user-specific candidate sets and associated parameters.

Figure 8:
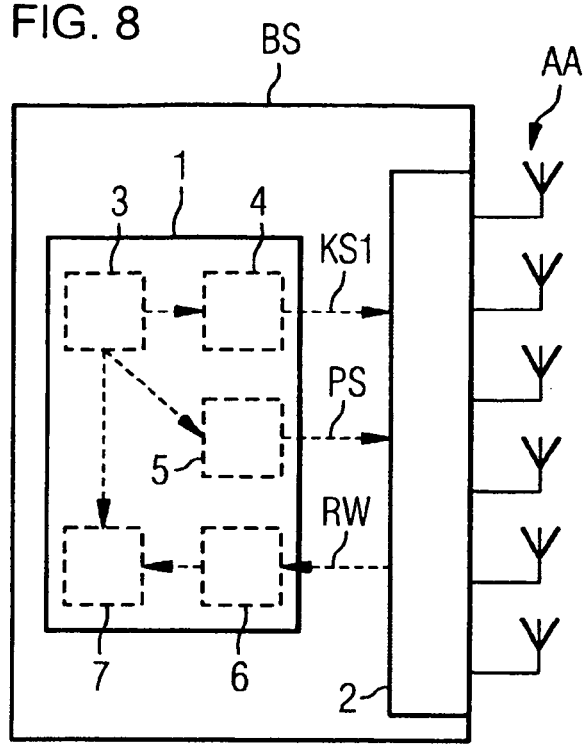

FIG. 8 shows a rough schematic diagram for a base station BS, with which this method can be performed.

This base station BS has an antenna array AA with a number of antennas. The antenna array AA is connected to a transceiver unit 2 of the base station BS, which is responsible for receiving and sending the signals over the antenna array AA. It is clear that the base station BS also features all further usual components of such a base station. To improve clarity however, FIG. 8 only shows the major components for executing the method.

One of these components is a beam configuration device 3, which defines the candidate set of beams B. I.e. this beam configuration device 3 looks after the definition of the first candidate set KS and also the selection of the individual beams B for the user-specific candidate sets NKS. The beam configuration device 3 receives the parameters necessary for this, such as for example the framework conditions and/or estimations about the long-term channel quality, from the components responsible for this (not shown in greater detail) of the components of the base station BS.

The beam configuration device 3 then for example transfers the user-specific candidate set NKS to a candidate set signaling device 4, which signals to the terminals the necessary information KSI about the beams B of the user-specific candidate set NKS In accordance with prescribed method. To this end the candidate set information KSI is communicated to the transceiver unit 2, which then looks after the transmission via the antenna array AA.

Both the beam configuration device 3 and also the candidate set signaling device 4 operate on a long-term scale.

The necessary information about the user-specific candidate sets NKS is also sent from the beam configuration device 3 to a pilot signal transmission device 5, which transmits on a short-term scale—for example at regular intervals between the individual TTIs—pilot signal PS over the beams B of the relevant user-specific candidate sets NKS to the terminals.

Furthermore the base station features a feedback receiving device 6, which likewise receives at regular intervals the feedback states RW, for example in the form of CQI values, from the individual terminals RX1, RX2, . . . , RX6 and then forwards these acknowledgement values RW on a beam assignment device 7, to the scheduler 7. This beam allocation device 7 has also been informed by the beam configuration device as to which users are assigned which user-specific candidate sets NKS.

On the basis of the acknowledgement values RW, the information about the user-specific candidate sets NKS as well as further information, the scheduler 7 then allocates to the different terminals RX1, . . . , RX6 suitable combinations of beams B for a subsequent signal transmission, for example for the next TTI.

The signaling to the terminals to be performed before the actual useful signal transmission from the base station over the allocated beams is undertaken by means of signaling devices (not shown) which can also be used for other signaling purposes.

Both the beam configuration device 3 also the candidate set signaling device 4, the pilot signal transmission device 5, the feedback receiving device 6 and the beam allocation device 7 can be realized in the form of software on a microprocessor 1 of the base station BS.

The two signaling devices 4 and 5 and the receiving device 6 are used to cause the transceiver unit 2 to transmit the corresponding signals in each case or to extract from the received signals the corresponding acknowledgement values RW, so that these can be transferred to the beam allocation device 7. In particular these devices 4, 5, 6 could thus also be integrated into other units of the base station, especially into the transceiver unit 2. The beam configuration device and the scheduler 7 can in principle also be implemented in other units of the mobile radio network and can undertake the corresponding tasks for the relevant base station.

Figure 9:
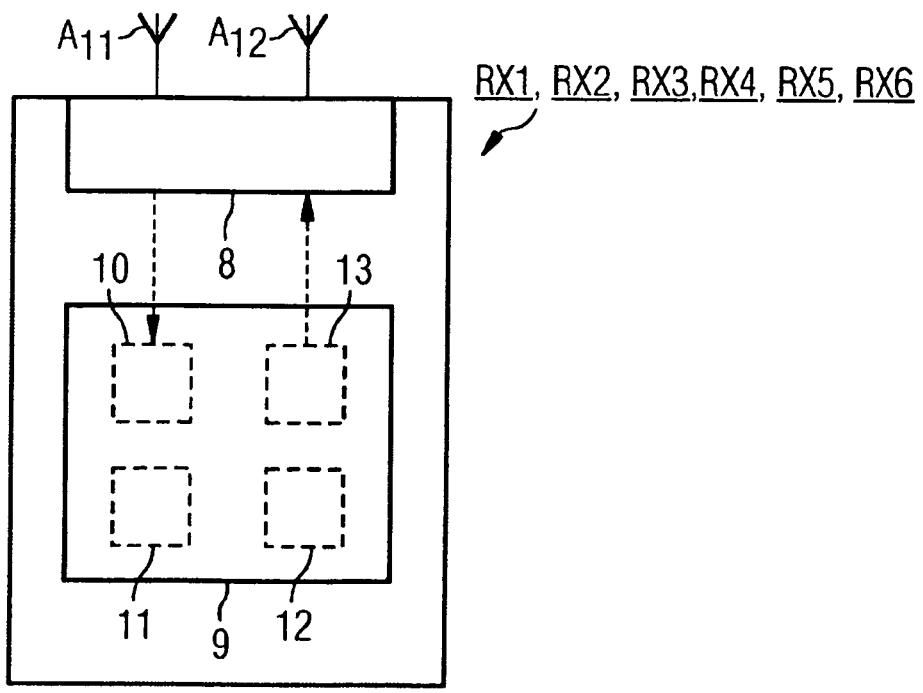

FIG. 9 shows in rough schematic form a mobile terminal RX1, . . . , RX6, which can be used in the inventive method.

Here too only the components of the most importance to the invention are included in the diagram for reasons of simplicity. I.e. the mobile terminal RX1, . . . , RX6 features all the components and functional units usually present in such terminals.

In the present example the terminal RX1, . . . , RX6 features an antenna array with two antennas A11, A12 which are each in turn connected to a transceiver unit 8. A receiving apparatus 10 is used for receiving different beams B transmitted from a base station BS and for receiving information via a candidate set NKS of beams B assigned to the terminal.

Furthermore the terminal RX1, ..., RX6 features a beam identification device 11 to identify a received beam B as belonging to a user-specific candidate set NKS. An SINR value is then determined by the beam quality determination device 12 for the beams B belonging to the candidate set NKS on the basis of pilot signals which the terminal RX1, ..., RX6 has received in each case about the different beams B from the base station BS. On the basis of this SINR value the acknowledgement value RW, for example the CQI value is then determined in a feedback device 13, and is then returned in its turn via the transceiver unit 8 and the antenna array with the two antennas A11, A12 to the base station BS.

The receiving device 10, the beam identification device 11, the beam quality determination device 12 and the feedback device 13 are here in their turn implemented in the form of software on a microprocessor 9 of the terminal RX1, ..., RX6. Basically these devices can however also be distributed between or integrated into a wide variety of other components and functional devices. Thus as a rule existing mobile radio devices feature corresponding receiving devices and feedback devices, since with the previous methods too the terminals estimate SINR values or similar channel quality values and returning these to the base station. Essential for the present invention however is that the mobile terminal RX1, ..., RX6 is in the position to identify a beam B to the extent of whether it belongs to the user-specific candidate set NKS of this terminal RX1, ..., RX6 and to ensure that only for these beams are the SINR values actually determined and acknowledgement values RW based on these are sent to the base station BS.

In conclusion it is pointed out once again that the method actually shown in the Figures and described above in detail involves exemplary embodiments which can be modified by the person skilled in the art without departing from the framework of the invention.

In particular detailed changes could be made to the individual methods in order to apply the method—other than previously presented here—not only for flat-fading data transmission methods but also for frequency-selective channels. Similarly it is also possible to use the method not only for adapted modulation and coding for individual data streams, i.e. for individual data stream coding, but for the invention to also be applicable to methods in which the data streams are not individually coded, e.g. in so-called outer-channel coding methods in which the coding is undertaken beyond the individual part beams through to a specific user.

Since long-term and short term adaptations are combined with each other here, the method in accordance with the invention can be employed with outstanding results in the area of low to average speeds of the individual terminals within the cell.

However the method can also be of benefit in the area of higher terminal speeds. The method is especially attractive for FDD methods but can also be useful especially with greater mobility of the individual users or speed of the terminals with TDD methods. Over and above this the method can be used for any number of air interfaces, for example GSM (Global System for Mobile Communications, 2nd mobile radio generation), UMTS (Universal Mobile Telecommunication system, 3rd mobile radio generation), WCDMA (Wideband Code Division Multiple Access, one of the standards of the 3rd mobile radio generation), OFDM-4G (Orthogonal Frequency Division Multiplexing for 4th Generation Systems) or similar systems.

We claim:

1. A method of allocating transmission capacities for signal transmission from a base station of a cellular radio network to a plurality of mobile terminals, the method which comprises:
    simultaneously emitting, from the base station, a plurality of directed beams to a plurality of mobile stations;
    initially defining a first candidate set of beams, with major parameters changing and only slowly in relation to a feedback time of the terminals;
    signaling information to the terminals from the base station over the beams of the candidate set;
    emitting pilot signals from the base station over the beams of the candidate set at short intervals relative to a modification time of the beams;
    determining an SINR value for each of the radio beams of the candidate set with the terminals, in each case with the aid of a received pilot signal;
    transmitting, from the terminals to the base station and for each received beam, an acknowledgement value determined on the basis of the relevant SINR value in each case; and
    allocating, on the basis of the acknowledgement values, to the different terminals suitable combinations of beams for a subsequent signal transmission from the base station.

2. The method according to claim 1, which comprises selecting from the beams belonging to the first candidate set a second, user-specific candidate set of beams, and, for each of the terminals, signaling the second candidate set of beams to the terminals concerned in each case, and wherein the terminals, with the aid of the received pilot signals, only determine for the beams of the user-specific candidate set assigned to them an SINR value in each case and transmit to the base station an acknowledgement value determined on the basis of the respective SINR value.

3. The method according to claim 1, which comprises varying the major parameters of the relevant candidate set of beams only slowly in relation to a coherence time.

4. The method according to claim 1, which comprises initially sending information from the base station to the terminals about a pilot structure of a pilot signal subsequently transmitted over the beams of the candidate set.

5. The method according to claim 1, which comprises determining, by the terminals, a CQI value as an acknowledgement value on the basis of the relevant SINR value in each case and transmitting the CQI value to the base station.

6. The method according to claim 1, which comprises transmitting information about the beams belonging to the candidate set and/or the transmit powers on the beams and/or the pilot structure over a general information channel from the base station to the terminals.

7. The method according to claim 1, which comprises defining the first candidate set based on a grid of beams including a plurality of beams, the grid of beams fully covering a one defined coverage area of the base station.

8. The method according to claim 1, wherein the acknowledgement values define a modulation and coding scheme with which the base station transmits over individual beams to different terminals.

9. A base station in a cellular radio network, configured for simultaneous signal transmission to a plurality of mobile terminals over a plurality of directed beams, the base station comprising:
    a beam configuration device for defining a candidate set of beams, wherein major parameters of the beams are changed only slowly in relation to a feedback time of the mobile terminals;

a candidate set signaling device for signaling to the terminals information about the beams of the candidate set of beams;

a pilot signal transmission device for emitting pilot signals at short time intervals in relation to the modification time of the beams over the beams of the candidate set to the terminals;

a feedback receiving device for receiving acknowledgement values from the mobile terminals, wherein the acknowledgement values were each determined on a basis of SINR values determined in each case with the aid of the received pilot signals for each received beam; and a beam allocation device for allocating to the mobile terminals, using the acknowledgement values, suitable combinations of beams for a subsequent simultaneous signal transmission to the plurality of mobile terminals.

10. A mobile terminal configured for the method according to claim 1, comprising:

a receiving device for receiving different beams emitted by a base station and for receiving information about a candidate set of beams assigned to a terminal;

a beam identification device configured to identify a received beam as belonging to the candidate set;

a beam quality determination device configured to determine an SINR value for the beams belonging to the candidate set on a basis of pilot signals, which the terminal has received in each case over the different beams from the base station; and a feedback device configured to transmit to the base station only the acknowledgement values for the beams belonging to the candidate set of the relevant terminal determined on the basis of the SINR values.

* * * * *